W. W. SMYTHE, Jr.
RECORD SHEET.
APPLICATION FILED JULY 26, 1920.

1,407,095.

Patented Feb. 21, 1922.
3 SHEETS—SHEET 1.

W. W. SMYTHE, Jr.
RECORD SHEET.
APPLICATION FILED JULY 26, 1920.

1,407,095.

Patented Feb. 21, 1922.
3 SHEETS—SHEET 2.

*Fig. 2*

GRAPHIC HANDICAP SCORE CARD

EVENT *Qualifying Round — President's Trophy*   DATE *July 4th, 1918*

MARK SPACE UNDER NET SCORE - [N] or [X]   MARK SPACE UNDER GROSS SCORE - [G] or [●]

| PLAYER | ORDER OF MATCH | 60 | | | | 70 | | | | 80 | | | | 90 | | | | 100 | OUT | 110 | | | | 120 | | | | 130 | | | | 140 | | IN | GROSS | HANDI-CAP | NET |
|---|---|---|---|---|---|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | | | | | | | | | | | | | | | | | |
| P.B.B. | 2 | 5 | 3 | 5 | 4 | 5 | 5 | 6 | 5 | 6 | 45 | 4 | 6 | 4 | 4 | 5 | 5 | 5 | 6 | 42 | 87 | 20 | 67 |
| C.A.B. | 3 | 6 | 4 | 4 | 6 | 6 | 4 | 5 | 4 | 6 | 45 | 4 | 5 | 4 | 3 | 5 | 4 | 5 | 5 | 40 | 85 | 13 | 72 |
| J.M.D. | 1 | 6 | 3 | 4 | 3 | 3 | 5 | 4 | 4 | 4 | 39 | 5 | 5 | 3 | 4 | 4 | 4 | 3 | 4 | 37 | 76 | 10 | 66 |
| C.B.C. | 4 | 6 | 4 | 5 | 6 | 6 | 6 | 4 | 3 | 4 | 43 | 4 | 8 | 4 | 5 | 5 | 3 | 4 | 3 | 38 | 81 | 7 | 74 |
| R.A.D. | 2 | 4 | 4 | 4 | 5 | 5 | 5 | 5 | 3 | 4 | 40 | 5 | 4 | 3 | 4 | 5 | 4 | 4 | 4 | 37 | 77 | 10 | 67 |
| M.M.D. | 4 | 7 | 3 | 5 | 4 | 6 | 5 | 8 | 6 | 7 | 50 | 3 | 6 | 5 | 4 | 5 | 4 | 4 | 5 | 36 | 86 | 12 | 74 |
| M.E.O. | 6 | 5 | 4 | 6 | 5 | 6 | 7 | 9 | 4 | 5 | 51 | 6 | 8 | 4 | 8 | 5 | 4 | 5 | 4 | 48 | 99 | 22 | 77 |
| F.E.Y. | 4 | 5 | 4 | 5 | 5 | 6 | 6 | 5 | 4 | 7 | 47 | 5 | 8 | 5 | 6 | 6 | 5 | 4 | 6 | 45 | 92 | 18 | 74 |
| F.F.B. | 5 | 5 | 4 | 8 | 5 | 6 | 7 | 7 | 6 | 6 | 56 | 6 | 8 | 6 | 6 | 6 | 4 | 4 | 4 | 47 | 103 | 27 | 76 |

Inventor
William W. Smythe Jr.
Edwin H. Smythe Atty.

W. W. SMYTHE, Jr.
RECORD SHEET.
APPLICATION FILED JULY 26, 1920.

1,407,095.

Patented Feb. 21, 1922.

UNITED STATES PATENT OFFICE.

WILLIAM W. SMYTHE, JR., OF PARK RIDGE, ILLINOIS, ASSIGNOR TO THE GRAPHIC SCORE BOOK COMPANY, OF PARK RIDGE, ILLINOIS, A CORPORATION OF ILLINOIS.

RECORD SHEET.

1,407,095.              Specification of Letters Patent.      Patented Feb. 21, 1922.

Application filed July 26, 1920. Serial No. 399,076.

*To all whom it may concern:*

Be it known that I, WILLIAM W. SMYTHE, Jr., a citizen of the United States, residing at Park Ridge, in the county of Cook and State of Illinois, have invented certain new and useful Improvements in a Record Sheet, of which the following is a full, clear, concise, and exact description.

My invention relates to a record sheet, and more particularly to a sheet or card adapted to receive a record of the scores of contestants in such events as golf tournaments.

My invention especially contemplates a record sheet or card adapted to have data entered thereon both in a numerical and in a graphical form, spaces being provided for entering the numerical data, and other spaces being provided in association with the first mentioned spaces for entering marks or symbols the particular location of which in the graphic spaces is in accordance with and determined by the value of the numerical data entered in the corresponding numerical spaces. My invention contemplates the provision of a record sheet adapted for use for the joint recording of numerical and graphical data both in connection with the records of the scores of games and contests, such as golf tournaments, and in connection with the recording of other data in which it is desirable to show on the same sheet both a numerical record and the corresponding graphic interpretation or translation of that numerical record. The principle of my invention may also be applied to the recording of such data as the scores of golf events and tournaments in a purely graphic form.

The record sheets or score sheets that are commonly used at the present time for recording the scores of the players in a golf tournament or qualifying round are provided with a horizontally extending space for the name and record of each player, this horizontally extending space being divided into sub-spaces or smaller spaces by vertical lines. The sub-spaces thus provided are adapted to have entered in them the name of each player, the number of strokes for each of the eighteen holes of the course, the total number of strokes for the first nine or " out " holes, the total number of strokes for the second nine or " in " holes, the " gross " score or number of strokes for the entire eighteen holes, the " handicap " of the player, and the " net " score, which is the number of strokes obtained by deducting the handicap from the gross score. When such a score sheet or card is used, it is difficult to determine the order in which the players in the tournament have finished; to do so it is necessary to make many examinations of the columns of figures representing the net scores and the gross scores of the various contestants. The best or lowest net score is first determined with the name of the corresponding player, then the next lowest net score is found and the name of the corresponding player, and this process is repeated until the names of the players have been determined and arranged in the order of the excellence or lowness of their net scores. If the event is one which requires a determination of the order of the players from the standpoint of the relative lowness of their gross scores, the process is repeated as to the column of figures in which the gross scores are entered. The determination of the relative standing of the contestants where the tournament scores are recorded on a sheet or card such as that referred to, is a slow laborious process, and is one in which it is easy to make mistakes by temporarily overlooking one or more of the lower scores until after some member having a higher score is recorded as being next in order. This commonly used system of recording scores is also subject to the objection that it is difficult to determine while the tournament is in progress, and as score after score is being turned in, the relative standing of the player whose score has just been added to the card or sheet.

In its application to the recording of the scores of golf tournaments and qualifying rounds, it is the particular object of my invention to provide means for recording the scores in a way that shows at a glance, and with the minimum of effort and likelihood of error, the relative standing of the contestants; and which enables the standing of the players to be immediately apparent at all times during the progress of the tournament.

I shall explain my invention in its application to the recording of golf events by reference to the accompanying drawings, in which Fig. 1 illustrates a handicap score card of the perferred form, part of the card being broken away; Fig. 2 illustrates such a card with a number of scores entered upon it to show the manner of its use; and Fig. 3 illustrates a modified form of handicap score card for recording the data graphically and numerically.

Referring first to the embodiment of the invention illustrated in Fig. 1, the score card or sheet is divided by horizontal lines into horizontally extending divisions, one for each of the players or contestants in the event. The horizontally extending divisions of the sheet are divided by a plurality of vertical lines into vertical columns of spaces. At the head of the vertical columns of spaces is a horizontally extending division in the spaces of which are placed the index words or numerals that indicate the data for which the blank spaces in the respective vertical columns are to be used. The first column, reading from left to right, is headed "Player," and the spaces in this column are used for entering the names of the contestants in the event. The next column is headed "Order of finish" and in this may be entered numbers indicating the relative standings of the various players at the end of the tournament or event. The next nine vertical columns from left to right are headed 1, 2, 3, 4, 5, 6, 7, 8 and 9 respectively, these index numerals at the head of the various columns indicating that in the main space in each of the corresponding nine columns are to be entered the number of strokes taken by each player in negotiating each of the first nine holes of the course. The next column in order has the word "Out" in its index space, and in the corresponding spaces in this column are entered the total number of strokes taken by each player in playing the first nine holes of the course. The next nine vertical columns in order are headed respectively 10, 11, 12, 13, 14, 15, 16, 17 and 18, and the main spaces of each of these columns are used for entering the number of strokes taken by each of the players for each of the second nine holes of the course,—that is, the holes numbered 10 to 18 inclusive. The next column is headed "In" and in the spaces of this column are entered the total number of strokes taken by each player in playing the second nine or "In" holes of the course. The next column is headed "Gross" and is used for recording the total number of strokes taken by each player in playing the entire eighteen holes. The next column is headed "Handicap," and in the spaces of this column are entered the handicap deductions that the handicap records of the club show are to be made from the gross scores of the respective players. The last column, in its index space, is headed "Net" and in the spaces of this column are entered the net scores of the various players obtained by deducting the number representing the handicap from the number representing the total or gross number of strokes taken by each of the players. Inasmuch as the last three columns are used for the recording of numbers that constitute a summary of the scores of the various contestants, these three columns may conveniently be slightly set off or distinguished from the preceding columns by making the vertical dividing line between the "In" column and the "Gross" column somewhat heavier than the other dividing lines that separate the horizontal spaces into vertical columns.

The features of the score sheet or card thus far described are those which provide for the numerical records of the contestants. In order to make provision for a graphical record of the event, I superpose, preferably upon the part of the sheet or card that is used for recording the strokes per hole of the players, a series of horizontal lines subdividing the row or division assigned to each player into two sub-rows; and the lower sub-row of each row or division is divided by vertical lines into an extended series of spaces. The spaces of the lower sub-row of each player's division are smaller than the spaces of the upper sub-row of each player's division, five spaces in the lower sub-row, in the preferred form of the score card illustrated, corresponding to one space in the upper sub-row of each division. The effect of this is to superpose upon the eighteen columns of spaces for receiving the numbers indicating the strokes per hole, eighteen times five or ninety columns of smaller spaces for receiving the marks that constitute the graphic record of the scores of the tournament. These ninety vertical columns of small spaces into which the lower sub-row of each division is divided, have associated with them corresponding horizontal rows of ninety index numbers running from 60 to 149 inclusive, and preferably running from left to right of the sheet. In order that the index numerals may be more easily readable, only the first of each ten numbers is printed in the space in full, as 60, 70, 80 etc., the other nine numbers of each set of ten being indicated merely by the units digit of the number. These index rows are repeated at intervals from top to bottom along the score card or sheet in order that the numbers to which the various smaller spaces of the lower sub-rows correspond may be accurately ascertained without the necessity of following the vertical dividing lines any great distance. There is also provided at the top of the graphic portion of the sheet an index row consisting of the numerals 60, 70, 80, 90, 100, 110, 120, 130 and 140, each of these numerals being printed in large type in a space equal in breadth to ten of the smaller spaces into which the lower sub-rows are divided, and serving as a general index character for the corresponding ten smaller spaces. In order to set off more clearly the graphic vertical sub-division of the chart or sheet by tens, the vertical dividing lines that separate each ten of the smaller spaces, and consequently each two of the larger spaces of the upper sub-rows, are printed heavier. The vertical lines that divide the lower sub-rows into the smaller graphic spaces are intermitted in the column headed "Out", and consequently the general index numeral 100 occupies the space of three of the main vertical columns,—those headed 9, "Out", and 10.

At the top of the sheet or card the title—"Graphic handicap score card", in the present instance—may be printed; and also a space may be provided designated "Event", in which may be written the title of the event or tournament for which the card in each case is used, and another space designated "Date" for entering the date upon which the event is played. Also in the present instance other words are printed at the top of the sheet indicating the manner in which the graphic spaces are to be marked to indicate graphically the records that are entered in the "Gross" and "Net" columns. At the bottom of the sheet there are provided, in the present instance, suitably designated spaces for entering the names together with the handicaps and gross and net scores of the first, second and third players in the order of their finish.

Fig. 2 illustrates the manner in which the score card or sheet is used in recording both numerically and graphically an event or tournament. The names of the players, as they start, are entered in the column headed "Player." Each player, as he finishes, turns in his card, and the numerical record that the card contains is transferred to the corresponding spaces on the handicap score card. In the larger spaces of the upper sub-row of the players' division that lie in the vertical columns headed 1 to 18 inclusive are entered the strokes that the player has taken in completing each of the eighteen holes of the course. In the spaces in the player's division that lie in the vertical columns headed "Out", "In" and "Gross" the total strokes that the player has taken in completing the first nine holes, the second nine holes and the entire eighteen holes are entered. Then the player's handicap is entered in the space of his division lying in the vertical column headed "Handicap", and the number of strokes obtained by deducting the handicap from the "Gross" strokes are indicated by a numeral entered in the space of that player's division lying in the vertical column headed "Net." In addition certain marks are made in the graphic spaces in the lower sub-row of this player's division corresponding in space location, as indicated by the index numbers, to the numeral representing the gross strokes and the numeral representing the net strokes.

For instance, in the tournament record illustrated in Fig. 2 the sum, 45, of the strokes taken by the first player for completing the first nine holes of play is entered in the column headed "Out"; the sum, 42, of the strokes taken by this player in completing the second nine holes is entered in the vertical column headed "In"; the sum, 87, of the strokes taken in completing the entire eighteen holes is entered in the corresponding space in the vertical column headed "Gross"; the handicap, 20, of this particular player is entered in the corresponding space in the vertical column headed "Handicap"; and the difference, 67, between the gross score 87 and the handicap 20 is entered in the corresponding space in the vertical column headed "Net." In addition the graphic space in the lower sub-row of this player's division the associated index number of which corresponds to the numeral of the player's net score, 67, is marked with an X; and the graphic space in the lower sub-row of this player's division the associated index number of which corresponds to the gross score, 87, is marked with an O.

As each player turns in his card the numerical data which it contains is transferred to the handicap score card and the corresponding graphic marks are made in the graphic spaces corresponding to the net and gross scores of that player, in the same manner as described for the first player. When the scores have all been turned in and entered in this way on the handicap score card, or at any time during the progress of play, the relative standing of the players may be instantly determined by observing the relative positions of the graphic marks of the players on the card or sheet. With the preferred arrangement of the score card or sheet illustrated the lowest scores are those the graphic marks of which appear farthest toward the left of the sheet, and the order in which the players finish may be determined by moving a vertical straight-edge from left to right across the face of the card and reading off or noting the names of the players corresponding to the graphic marks as they appear one after the other to the left of the straight-edge.

A modified form of the graphic handicap score card is illustrated in Fig. 3. This modified form is particularly designed to be used where it is not desired to make any record on the card of the number of strokes taken by each player for each of the eighteen holes; only the aggregate scores for the first nine holes, the second nine holes and the entire round being recorded, together with the handicap and net score of the player.

In this modification the score card or sheet is divided by horizontal lines into a series of divisions, one for each player; and these horizontal divisions are divided by a series of vertical lines into columns of spaces. At the head of the vertical columns of spaces is a horizontally extending main division in the spaces of which are placed the index words or numerals that indicate the data for which the blank spaces in the respective vertical columns are to be used. The first column, reading from left to right, is headed "Player," the spaces in this column being used for entering the names of the contestants. The next vertical column is headed "Order of finish" and in the spaces of this column numerals may be entered, at the conclusion of the event and after all the scores are in, to indicate the numerical position of each contestant in a list of the players arranged in accordance with the relative lowness of their respective scores. The next nine main columns are headed 60, 70, 80, 90, 100, 110, 120, 130 and 140, respectively. Each of these main columns is divided into ten sub-columns, as a result of which each player's division contains a horizontal row of ninety small spaces, the ninety spaces being divided by the relatively heavy lines of the main columns into nine groups of ten spaces each, and each of these groups of ten small spaces being divided by a moderately heavy vertical line into two sub-groups of five spaces each. Associated at intervals from top to bottom with the rows of small spaces, are horizontal rows of ninety index numbers running from 60 to 149 inclusive, and preferably running from left to right of the sheet. Only the first of each ten numbers of the index row is printed in the space in full, the other nine numbers of each set of ten being indicated merely by the units digit of the number. Rows of small spaces of the various players' divisions are preferably slightly separated or set off from each other by providing parallel spacing lines between the successive horizontal divisions.

To the right of the last of the numbered main columns is a column headed "Out," in the spaces of which column are entered the total number of strokes taken by each player in playing the first nine holes of the course. The next column is headed "In," and in its spaces are entered the numbers representing the strokes taken by each player in playing the second nine holes of the course. In the spaces of the next column, headed "Gross," are entered the numbers representing the total number of strokes taken by each player in completing the round; in the spaces of the next column, headed "Handicap," are entered the numbers representing the handicap deductions for the various players; and in the spaces of the last column, headed "Net," are entered the net scores of the various players obtained by subtracting their handicap allowances from their gross scores.

As the score cards are turned in, the data which they contain is transferred to the handicap score card of Fig. 3 and marks made in the graphic spaces corresponding to each player's net and gross scores, in the same manner as has already been described in connection with the handicap score card of Figs. 1 and 2, excepting that the strokes per hole are not entered when the card of Fig. 3 is used. In the modification of Fig. 3 the numerical data is entered in the columns at the right of the card, and the graphical translation of the significant part of this data is entered in the graphical spaces provided in the center of the card, the central or middle portion of the card being arranged or adapted for the entering of graphical marks exclusively.

What is claimed is:

1. A golf score sheet comprising a plurality of horizontal main rows each of which is divided into a plurality of sub-rows, lines dividing one of the sub-rows in each main row into a certain number of spaces, lines dividing another sub-row of each main row into a greater number of spaces, and a plurality of rows of index numerals, the numerals of each row being positioned to correspond to the spaces of a particular one of said sub-rows.

2. A golf score sheet divided by horizontal lines into a plurality of main rows, each of said main rows being divided by other horizontal lines into sub-rows, vertical lines dividing all of said sub-rows into spaces, other lines dividing said spaces of corresponding sub-rows in each main row into spaces relatively smaller than said first named spaces, a row of index numerals corresponding to the spaces of the larger-space sub-rows, and a plurality of rows of index numerals associated at intervals with said main rows and corresponding to the spaces of said smaller-space sub-rows.

3. A record sheet divided by parallel lines into a plurality of rows, transverse lines dividing corresponding portions of said rows into spaces suitably indexed for the entry of numbers, and other transverse lines dividing other corresponding portions of said rows into an extended series of spaces, said last mentioned spaces being indexed by a series of numbers for the entry in said spaces of marks corresponding in their space location to the numbers that may be entered in the first mentioned spaces of the corresponding rows.

4. A golf score sheet divided by horizontal lines into a plurality of rows, vertical lines dividing a portion of each of said rows into spaces in which numbers may be entered, other vertical lines dividing other portions of said rows into an extended series of smaller spaces, a series of index numerals associated with the extended series of spaces of said rows, said numerals comprehending in their range the range of numbers that are likely to be entered in said first-mentioned spaces, whereby marks or symbols may be entered in the particular spaces of the extended series of each row corresponding in their space location to the numerical value of numbers that may be entered in said first-mentioned spaces of the corresponding row.

5. A golf score sheet, divided by parallel lines into a plurality of rows, said rows being divided by transverse lines into numerical columns suitably indexed for the entry of numbers and into an extended series of graphical columns indexed by a consecutive series of numbers, said graphical columns being adapted to have entered in them marks occupying spaces corresponding in their index numbers to the numbers that may be entered in the numerical columns of the corresponding row.

6. A record sheet, divided by horizontal lines into a plurality of rows, said rows being correspondingly divided by vertical lines into numerical spaces arranged for the entry of numbers and into series of graphical spaces arranged for the entry of marks, and rows of index numerals associated at intervals with said corresponding graphical spaces of the various rows, said numerals being the same for the correspondingly positioned graphical spaces of the various rows, and comprehending in their scope the range of numbers that are likely to be entered in said numerical spaces.

In witness whereof, I hereunto subscribe my name this 23rd day of July, A. D., 1920.

WILLIAM W. SMYTHE, Jr.